Figure 4:
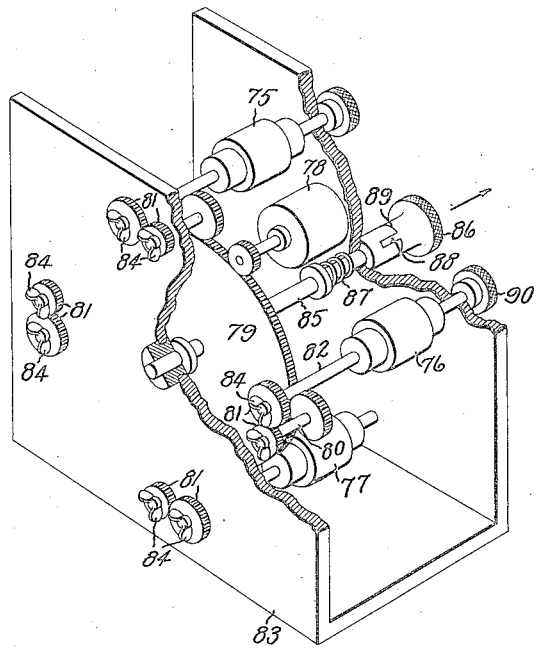

Oct. 1, 1935.  H. B. LA ROQUE ET AL  2,016,148
CONTROL SYSTEM
Filed Aug. 12, 1931  3 Sheets-Sheet 1
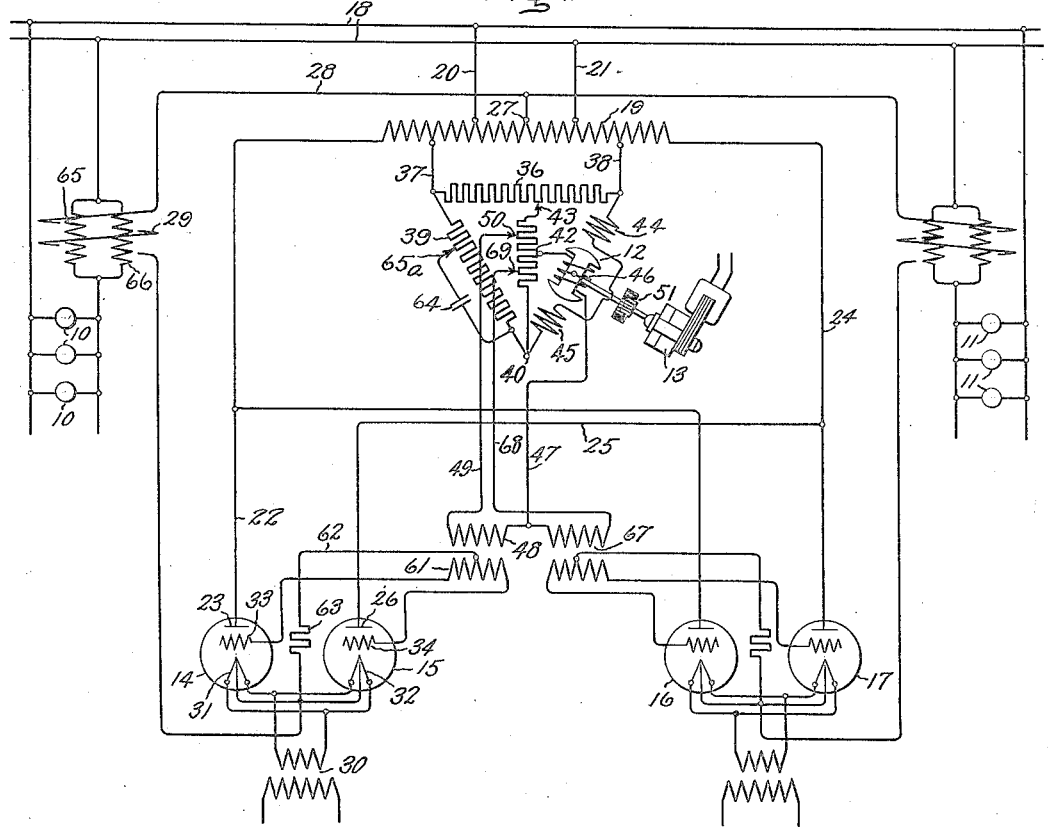
Fig. 1.
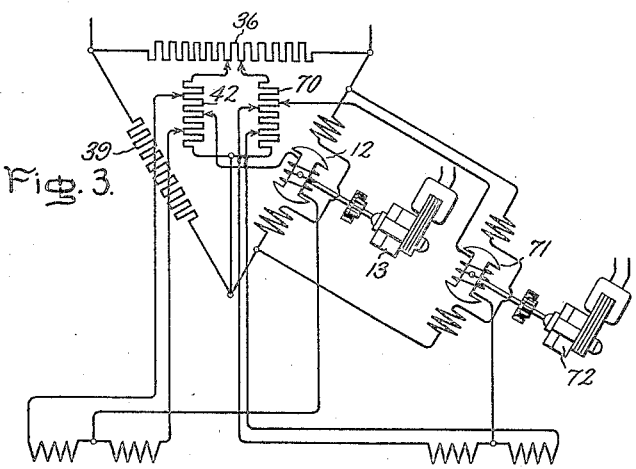
Fig. 3.
Fig. 2.
Inventors:
Harold B. La Roque,
Frank R. Elder,
by Charles E. Mullen
Their Attorney.

Inventors:
Harold B. La Roque,
Frank R. Elder,
by Charles N. Tullar
Their Attorney.

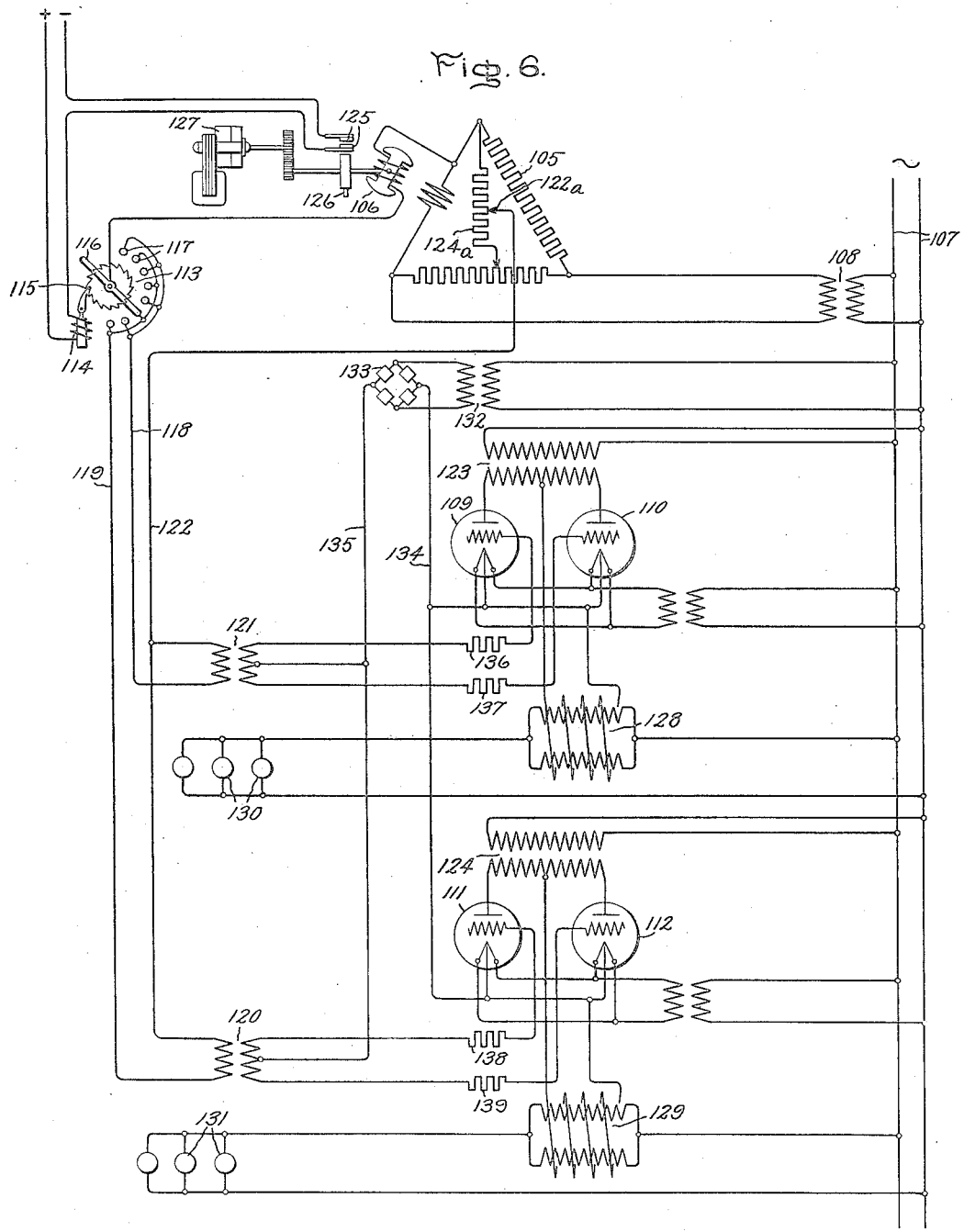

Patented Oct. 1, 1935

2,016,148

UNITED STATES PATENT OFFICE 2,016,148

CONTROL SYSTEM

Harold B. La Roque, Scotia, and Frank R. Elder, Schenectady, N. Y., assignors to General Electric Company, a corporation of New York Application August 12, 1931, Serial No. 556,702

7 Claims. (Cl. 175—363)

Our invention relates to control systems for electric circuits, more particularly to control systems in which electric discharge devices are utilized, and has for its object simple and reliable means giving great flexibility of control.

Our invention has special use in the control of electric circuits containing incandescent lamps although it has application to circuits containing various other types of devices. It is particularly useful in the control of decorative lighting installations, such as for show windows, flood lighting, electric signs, etc. In connection with the control of electric lights, an object of the invention is an automatic mobile color lighting system operating to give a predetermined sequence of color control with resultant blending of colors or, if desired, a continual change in color permutation of almost endless variety.

In accordance with our system of control the lights of a particular group can be alternately dimmed and brightened in a predetermined cycle, the duration of which can be readily adjusted. Also the shape of the lighting or dimming wave can be readily varied with respect to the proportionate part of the cycle over which the lights are dimmed or brilliant. For example, the cycle can be adjusted so that the lights come quickly up to full brilliancy and remain fully brilliant over the greater portion of the cycle, or the adjustment may be such that the lights are more or less completely dimmed over the greater portion of the cycle and are fully brilliant during only a relatively short interval. Our invention also comprehends the control of a plurality of banks of lights, preferably of different colors, in some desired relation as to degree of illumination together with means whereby this relation may be adjusted or continuously varied. Also the control may be readily changed from full automatic to hand control.

In carrying out our invention we utilize electric discharge devices of the vapor type for rectifying an alternating current for the control circuit. In the control of the discharge devices we control the phase displacement of an alternating input or grid voltage with respect to an alternating output or anode voltage by applying to the input circuit the vector sum of two alternating voltages having a predetermined phase relation with respect to each other, one of these voltages being variable in magnitude between predetermined positive and negative limits so as to vary the phase displacement of the input voltage, substantially as described and claimed in Patent No. 1,899,575 to Harold B. La Roque, dated February 28, 1933, of which this invention is an improvement. We provide improved means for obtaining the dephased voltages from a single phase supply source, together with means for adjusting the magnitude and phase angle of one of the alternating input voltages so as to vary the shape of dimming wave. Moreover, we provide means for continuously varying the magnitude of one of the input voltages so that the input voltage is continuously shifted in phase back and forth between predetermined limits at a speed which is variable. In the control of a plurality of groups of lights, we also provide means for changing the phase angles of the input voltage at different rates to give a further variety of color combinations as well as intermittent control. Also the control can be changed from full automatic to hand control for one or more groups.

Figure 5:
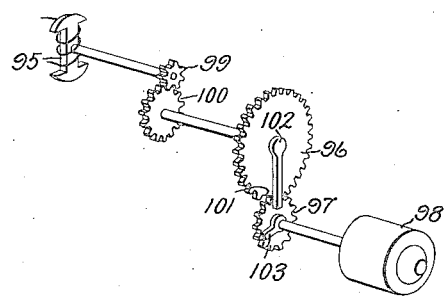

For a more complete understanding of our invention reference should be had to the accompanying drawings, Fig. 1 of which is a diagrammatic representation of a system of control for a plurality of groups of lamps embodying our invention; Fig. 2 is a diagrammatic view showing the vector relation of the various input and output voltages involved; while Fig. 3 is a fragmentary diagrammatic view showing a modified form of our invention; Figs. 4 and 5 are simplified views in perspective showing driving means for the voltage regulators; while Fig. 6 is a diagrammatic view showing a modification of our invention.

Referring to Fig. 1 of the drawings, we have shown our invention in one form as applied to the control of a plurality of groups or banks of lamps 10 and 11, the degree of brilliancy of each of which is varied in accordance with a predetermined time cycle by means of an inductive voltage regulator device 12. This device is driven by a substantially constant speed electric motor 13, preferably of the type described and claimed in U. S. Patent No. 1,546,269 to H. E. Warren, dated July 14, 1925. More specifically the lamp circuits are controlled by three element electric discharge devices or tubes of the vapor type, these devices acting as arc rectifiers. As is well known in the art, the sealed envelope of a discharge device of this type contains a small quantity of an inert gas, such as mercury vapor, whereby the device becomes an arc rectifier, its arc formation being controlled by a grid. The lamp bank 10 is controlled by the discharge devices 14 and 15, while the lamp bank 11 is controlled by the devices 16 and 17. Each pair of discharge devices is connected to rectify both halves of the alternating current wave supplied to their output circuits from a suitable alternating current source of supply 18. In view of the fact that the controls for the two banks are identical, except that they are so arranged that one bank is being dimmed while the other is being brightened and vice versa, the invention will be described in detail with respect to one bank of lamps only, i. e., the bank 10.

The output or anode circuits of the discharge devices 14 and 15 are supplied with alternating current from the source 18 through a suitable transformer shown as an auto transformer provided with a winding 19. A portion of the winding 19 constituting the primary, shown as a central portion, is connected to the supply source through conductors 20 and 21. One terminal of the winding is connected through a conductor 22 to the anode 23 of the discharge device 14 while the other terminal is connected through the conductors 24 and 25 to the anode 26 of the discharge device 15. A central point 27 of the winding 19 is connected through a conductor 28 and the winding 29 of a reactance control device to the cathodes 31 and 32. The cathodes are also connected to a suitable heating transformer 30. It will be understood that the output circuit through the control reactance 29 is completed through the cathodes and anodes of the discharge devices alternately when they are in operation so as to rectify predetermined portions of both halves of the cycle under the control of the grids 33 and 34 of the discharge devices.

Our invention relates in one of its aspects to a control for the voltage applied to the grids 33 and 34. It will be understood that it is a characteristic of vapor electric discharge devices or tubes of this type that the current may be controlled by changing the phase relation between the grid or input voltage and the anode or output voltage. Furthermore, the device starts to operate to pass current only when the input voltage has the same polarity as the output voltage. That is, when the input voltage becomes positive to a predetermined degree, depending upon the characteristics of the tube, during some part of the positive half of the output alternating current wave, then the device starts to operate and continues to operate during the completion of that half of the wave irrespective of the value or direction of the input voltage. Furthermore, as long as the input voltage is more negative than the critical voltage at which the arc starts, the arc is prevented from starting and no current will flow. By shifting the phase relation of the input voltage, the current through the device may therefore be controlled.

The input voltage is obtained from the auto transformer winding 19. As shown, a resistance 36 is connected across an intermediate section of the transformer by means of conductors 37 and 38. In parallel with the resistance 36 and in series with each other are the stator coils of the inductive voltage regulator device 12 and a second resistance 39. The point of connection 40 between the inductive device 12 and the resistance 39 is connected through a resistance 42 to an intermediate point of the resistance 36. For adjustment purposes, an adjustable connection 43, such as a slider or a contact arm cooperating with a plurality of taps on the resistance 36 is provided between the two resistances. It will be understood that by providing a sufficient number of taps in the winding 19 to give the desired fineness of adjustment, the connection 43 may be made directly with the winding 19 without using the resistance 36. The resistance, however, is preferred since it lends itself readily to small adjustment steps.

The inductive device 12 comprises two inductively related windings, one of which is rotatably mounted so that the inductive relation between them may be changed. As shown, the stator winding consisting of the two sections 44 and 45 is connected in series with the resistance 39. These two sections constitute an inductance in series with the resistance 39 whereby a dephased voltage is applied to the resistance 42. The rotatably mounted winding 46, which is preferably provided with a suitable iron core as is also the stationary winding, has one terminal connected to an intermediate point, preferably the central point, of the resistance 42 while its other terminal is connected through a conductor 47 to one terminal of the primary winding 48 of a suitable grid transformer. The other terminal of the transformer winding 48 is connected through a conductor 49 to the resistance 42 at some point giving a predetermined suitable voltage between it and the central point connected to the rotatable winding 46. An adjustable connection 50 is used here also, such as taps, or a slider so that the value of this voltage also may be adjusted as desired. The rotatable winding 46 is mounted on a suitable shaft which may be driven through a speed reducing gearing 51 by means of the motor 13. It will be observed that a voltage is induced in the winding 46 by reason of its inductive relation with the windings 44 and 45, which voltage varies in magnitude from a maximum value in one direction to a maximum value in the opposite direction and which when added to or subtracted from the voltage drop across resistance 42 gives a resultant voltage across grid transformer 48 the phase positions of which is in dependence upon the angular position of the winding 46. In other words, with the winding 46 in the position shown, a maximum voltage in one direction is induced in the winding 46, with the winding displaced 90° from this position this induced voltage is zero, while a displacement of 180° from the position shown induces the maximum voltage in the opposite direction.

By reference to Fig. 2 the relations of the voltages impressed on the primary winding 48 of the grid transformer may be understood. The anode or output voltage 55 is of course derived by the autotransformer directly from the supply source 18. The grid component voltage obtained from the resistance 42 is represented by the vector 56. Its value or magnitude may be adjusted by means of the adjustable connection 50 and its phase relation with the voltage 55 may be adjusted by means of the connection 43. The maximum voltages induced in the winding 46 are indicated by vectors 57 and 58. When this induced voltage has a value indicated by the vector 57 this voltage, when combined vectorially with the voltage 56, produces a resultant voltage indicated by the vector 59 which is applied to the primary winding 48 of the grid transformer. Also when the induced voltage is the maximum in the opposite direction, as indicated by the vector 58, the resultant voltage 60 is applied to the grid transformer.

It will be observed that the voltage 59 lags behind the anode voltage through an angle A while the voltage 60 leads the anode voltage by an angle B. By varying the induced voltage between the two maximums the phase angle of the grid voltage with respect to the anode voltage can thus be shifted between the two limits indicated by the vectors 59 and 60, i. e., through the angle A and B. Therefore, with the winding 46 continuously driven by motor 13, the resultant grid voltage is continuously shifted in phase angle back and forth between these two limits. The discharge devices are thereby controlled to vary the intensity of the lights. As shown, the voltages are applied to the grids from the secondary winding 61 of the grid transformer having its terminals connected to the grids 33 and 34 and a midpoint connected through a conductor 62 and a grid current limiting resistance 63 to the cathodes of the discharge devices.

It will be understood that in the control of the discharge devices, when the grid voltage lags behind the anode voltage 55 through the angle A, which for purposes of illustration is shown as approximately 120°, the grid becomes sufficiently positive to set the discharge devices in operation only during approximately the last 60° of the positive half of the output voltage wave, the two discharge devices operating to supply a pulsating direct current only through these relatively small portions of the waves. This does not energize the lamps sufficiently to cause them to emit any visible or appreciably visible illumination and consequently the lights are dark. As the angle A decreases, greater and greater portions of the alternating waves are rectified with correspondingly increased energization of the lamps whereby they are gradually brought up to full brilliancy, this occurring when the grid voltage becomes approximately in phase with the input voltage. Furthermore, the lamps remain fully brilliant during the period that the grid voltage is leading through the angle B as will be understood from the previous description and characteristics of the discharge devices.

If it is desired to maintain the lights fully brilliant during the greater portion of the light cycle, the voltage 56 is adjusted in phase by means of the adjustable connection 43 so as to be more nearly in phase with the voltage 55 and thereby increase the angle of lead B. A decrease in the value of the voltage 56 has a similar effect. Also the phase angle between the voltage 56 and the voltage 55 may be made greater than that shown in Fig. 2 to such an extent that the resultant voltage 59 will be lagging throughout its entire phase displacement. An increase in this amount of lag decreases the proportionate part of the cycle during which the lamps are fully brilliant so that the lights may be made dark throughout the greater portion of the cycle. Great flexibility of control is thereby obtained.

The voltage 56 can also be shifted in phase with respect to the anode voltage 55 by varying the effect of a suitable condenser 64 which is connected across the resistance 39. An adjustable connection 65a is provided between the condenser and the resistance 39 whereby this adjustment can be made. If desired, a variable condenser may be used. A suitable variable condenser may also be connected across the windings 44 and 45 for a similar purpose.

Any suitable type of reactance may be used to control the lamp circuit. Preferably, however, the reactance comprises two similar windings 65 and 66 connected in parallel in the lamp circuit on a suitable iron core and oppositely wound so that their induced voltages exactly counterbalance each other while surrounding these two windings is the direct current saturating winding 29. This arrangement prevents detrimental inductive action between the winding 29 and the two windings 65 and 66. It will be understood that the current in the lamp circuit is controlled by varying the saturation of the core of the reactance by the current through the winding 29, an increase of current in the winding 29 increasing the saturation and hence increasing the brilliancy of the lamps, and vice versa.

As previously stated, the control for the lamps 11 is 180° displaced with respect to the lamps 10 so that when the lamps 11 are dark then the lamps 10 are fully bright, and vice versa. Furthermore, when the illumination of one bank is increasing the other is decreasing. To effect this, the primary winding 67 of the grid or input transformer for the discharge devices 16 and 17 is connected in series with the rotatable coil 46 through the conductor 47 connected to one terminal of the winding 67, the other terminal of this winding being connected through a conductor 68 and an adjustable connection 69 to some point on the resistance 42 on the opposite side with respect to the connection 50 from the central connection with the coil 46. In other words, the winding 46 is connected to a point between the two connections 50 and 69. This, it will be observed, reverses the vector voltage 56 introduced by the resistance 42. Furthermore, the connections of the primary winding 67 with the rotatable winding 46 are reversed with respect to the connections with the winding 48 and consequently the grid voltage applied to the discharge devices 16 and 17 is displaced 180° with respect to the grid voltage applied to the discharge devices 14 and 15.

In the modified form of our invention shown in Fig. 3, we have shown a second resistance 70 which is connected in parallel with the resistance 42. This provides for the control of an additional group or plurality of groups of lights, a second inductive voltage regulating device 71 driven by a motor 72 being provided. The connections will be understood from the previous description given in connection with Fig. 1. This figure indicates the flexibility of the control for additional groups of lamps. Additional groups may be added while utilizing a common resistance 36 and common resistance 39 by simply adding additional parallel connected resistances similar to 42, as indicated by the connection of the resistance 70, with individual inductive voltage regulating devices and driving motors.

In a system of this type the lighting effects may be further varied by varying the length of the time cycle for the lights. This is accomplished by adjusting the driving speed for the voltage regulating devices either by changing the speed of the driving motor or the gear ratio connecting the driving motor with the voltage regulating device. Thus, a plurality of groups of lamps, each group perhaps being divided into sub-groups which are controlled simultaneously, may be operated on time cycles of different lengths to produce continuously varying lighting effects.

A plurality of of voltage regulating devices may also be operated by a single driving motor and in Fig. 4 we have shown a driving arrangement for this purpose wherein provision is made for varying the driving ratio for each regulating device so as to change the duration of the time cycles for the groups of lights controlled by the respective voltage regulating devices. Furthermore, provision is made also for the individual setting of each regulating device. The driving connections are shown in connection with three regulating devices 75, 76 and 77 although any convenient number can be provided. The regulating devices are driven from a common driving motor 78 which is connected to drive a relatively large common driving gear 79. This gear 79 is connected through gearing to a plurality of counter shafts 80, one for each regulating device, which countershafts are each connected through a pair of gears 81 to the shaft 82 of their respective regulator. Preferably each set of gears 81 is placed on the exterior of the supporting framework 83 as indicated, and preferably also the gears are secured on their respective shafts by wing nuts 84 whereby the gears may be readily removed by hand and replaced by gears having a different driving ratio. Therefore, by suitably selecting the driving ratio for the sets of gears 81 the duration of the lighting time cycle can be varied as desired.

The large gear 79 is mounted on a shaft 85 which may be moved axially in the direction indicated by the arrow by grasping and pulling a knurled knob 86 at one end. This movement in the direction of the arrow is against the tension of a spring 87 which normally holds the shaft 85 and gearing 79 in the position shown. The gear 79 may thus be moved axially to disengage its driving connection with the various countershafts as well as the driving motor 78 and by turning the knurled knob 86 a spline 88 may be caused to ride on a fixed shoulder 89 and thereby secure the gear 78 in its displaced position. The regulating devices are then free and may be turned independently of each other by their respective knurled knobs 90 so as to adjust their respective banks of lamps to any desired initial setting. For example, it may be desired to initially set some of the banks fully bright and some fully dark. Ordinarily, however, this initial adjustment will be utilized where the sets of gears 81 have the same driving ratio. In the event that the driving ratios are different, the brilliancy relation of the lights is continually changing and consequently there would be no object in making an initial setting. However, with the same driving ratios the initial setting once made will be obviously maintained.

In Fig. 5 we have shown an intermittent gearing arrangement between the driving motor and the inductive voltage regulating device 95 whereby the color cycle is shifted at predetermined intervals. As shown, two gears 96 and 97 are provided between the regulating device and its driving motor 98. An additional set of gears 99 and 100 having a 2:1 driving ratio is also provided so that the regulating device 95 is driven at twice the speed of the gear 96. The gear 96 is provided with a mutilated section 101, and with an arm 102 secured thereto and having its outer end situated midway of the mutilated sector. This outer end of the arm is in the path of an arm 103 secured to the gear 97.

In the operation of this arrangement the motor 98 rotates continuously and drives the gear 96 around until the mutilated sector 101 is reached whereupon the gear 96 stops since the teeth of the gear 97 will then be turning in the space provided by the mutilated sector. The gear 96 remains at rest until the arm 103 comes around and engages the arm 102 and thereby carries the arm 102 and with it the gear 96, around far enough for the teeth of the two gears to be engaged whereupon the gear 96 is driven as before throughout a complete revolution until the mutilated sector is again reached.

With the 2:1 driving ratio provided by the gears 99 and 100, the regulating device is given two complete revolutions for each revolution of the gear 96 so that during one revolution of the gear 96 the lights may, for example, be brought up to full brilliancy, then dimmed and then brought up to full brilliancy again at the time the mutilated sector is reached, the lights remaining fully brilliant for the interval before the gear 96 is again started. Obviously, this relation can be varied by varying the ratios of the gears 99 and 100 as desired. In the arrangement shown the period of time over which the lights remain fully brilliant is thus longer every alternate cycle. By making the ratio of the gears 99 and 100 3:1 instead of 2:1 every third cycle is increased in time and so on. Also the increase in time may be with respect to the period over which the lights are fully dark, if desired, by suitably adjusting the driving connection so that the lights are dark when the mutilated sector is reached.

In Fig. 6 we have shown our control means embodied in a system with means for the automatic shifting of control from one group of lamps to another at some predetermined point of the control cycle. This control shifting means and its combination with our control means form no part of our invention, these features being described and claimed in a co-pending application of Harold B. La Roque, Ser. No. 680,569, filed July 15, 1933, which application is a continuation in part of the present application. In this system only one resistance device 105 with a single voltage regulating device 106 is provided, these devices being energized from the alternating current supply source 107 through a separate transformer 108. The connections between the resistance device and the voltage regulator 106 and the two sets of discharge devices 109, 110 and 111, 112 are similar to those disclosed in connection with Fig. 1 and hence they will not be traced in detail.

A selector switch 113 is connected in the circuit with the regulator 106 whereby the voltage from the regulator is alternately applied to the grid circuits of the two sets of discharge devices. This selective switch is operated step by step by means of a solenoid 114 which operates a ratchet mechanism 115 when it is energized to move a contact arm 116 around one step each time the solenoid is energized. The contact arm is thus moved from one to another of a series of spaced stationary contacts 117, the alternate contacts of which are connected through conductors 118 and 119 respectively to one terminal of the primaries of the grid transformers 120 and 121. The opposite terminals of the primaries are connected to a common conductor 122 which leads to an adjustable tap 122a on the resistance 124a which, it will be understood, corresponds with the resistance 42 of Fig. 1. The secondary winding of the transformer 120 has its terminals connected respectively to the grids of the discharge devices 111 and 112, and the terminals of the secondary of the transformer 121 are likewise connected respectively to the grids of the tubes 109 and 110. The output circuits for the pairs of tubes are supplied respectively from the transformers 123 and 124.

The energization of the coil 114 is controlled by a contact device 125 having normally separated contacts whereby the circuit of the solenoid is maintained open. The rotor shaft of the regulator 106 is provided with a projection 126 which each revolution comes into position to engage one of the contacts of the pair 125 and moves it into engagement with the other whereby the circuit of the solenoid 114 is closed and the contact arm 116 moved to the next contact 117. The regulating device is driven by a motor 127. Therefore, each revolution of the regulating device the solenoid is energized and the contact arm moved over to connect the regulating device to the other set of discharge devices. After each connection the regulating device is thus turned through a complete revolution before the connections are changed thus controlling the lights of the particular bank throughout a complete lighting cycle. Preferably the projection 126 is so arranged on the shaft with respect to the angular position of the regulating device that the lights are fully darkened when the control is transferred. As shown, suitable reactors 128 and 129 are included in the output circuits of the pairs of discharge devices for the control of the groups of lamps 130 and 131. If desired, however, the transfer of control can be made at any desired point of the lighting cycle by suitably adjusting the angulalr position of the projection 126 with respect to the regulator.

It is furthermore contemplated that each group of lamps will be fully darkened when the control is connected to the other group and to assure that the discharge devices are prevented from operating under such conditions the discharge devices are given a suitable fixed grid bias voltage by means of a transformer 132 and a suitable two-way rectifier 133. This rectifier is shown as a copper oxide rectifier. One terminal of this rectifier is connected through a conductor 134 directly to the cathodes of all four tubes while the other terminal is connected through a conductor 135 to midpoints on the secondaries of the grid transformers 120 and 121.

Suitable resistances 136, 137, 138, 139 are connected in the respective circuits of the grids to limit the grid current and prevent short circuits therethrough.

What we claim as new and desire to secure by Letters Patent of the United States, is:

1. The combination in a system of control, of an electric discharge device provided with input and output circuits, a source of alternating current for applying an alternating voltage to said output circuit, a resistance connected to said source, means associated with said resistance for producing a second voltage having a predetermined phase relation with the voltage of said source, means associated with said resistance for producing a third voltage having a predetermined phase relation with said second voltage, means for varying said third voltage from a maximum in one direction to a maximum in another direction and means for applying the resultant of said second and third voltages to the input circuit of said discharge device.

2. The combination in a system of control, of an electric discharge device provided with input and output circuits, means for applying an alternating voltage to said output circuit, means including an inductive winding for producing a voltage having a predetermined phase relation with said output voltage, movably mounted means inductively associated with said winding so as to produce a second voltage varying with the position of said movably mounted means with respect to said winding and means for applying the resultant of said voltages to the input circuit of said discharge device.

3. The combination in a system of control, of an electric discharge device provided with input and output circuits, means for applying an alternating voltage to said output circuit, a pair of inductively associated relatively movable windings, means including one of said windings for producing a voltage having a predetermined phase relation with said output voltage, a second dephased voltage being thereby induced in said second winding, means for applying the resultant of said voltages to said input circuit and means for relatively displacing said windings to vary said second voltage and thereby control the phase relation of said resultant voltage with said output voltage.

4. The combination in a system of control, of an electric discharge device provided with input and output circuits, means for applying an alternating voltage to said output circuit, means including an inductive winding for producing a voltage having a predetermined phase relation with said output voltage, a second winding inductively associated with said first winding, said windings being relatively rotatable so that a voltage is induced in said second winding having a direction and value depending upon the relative angular positions of said windings, means for applying the resultant of said voltages to said input circuit and means for turning said rotatably mounted winding to control said discharge device.

5. The combination in a system of control, of an electric discharge device provided with input and output circuits, means for applying an alternating voltage to said output circuit, a resistance and an inductance connected in series with each other to said voltage applying means, a second resistance connected between an intermediate point of said voltage applying means and a point between said first resistance and said inductance, means associated with said inductance for producing a second voltage varying between a maximum value in one direction and a maximum value in another direction and means for applying the resultant of a voltage drop across said second resistance and said second voltage to the input circuit of said discharge device.

6. The combination in a system of control of an electric discharge device provided with input and output circuits, a source of alternating current for applying an alternating voltage to said output circuit, a resistance, a pair of inductively associated relatively rotatable windings, connections whereby one of said windings is connected in series with said resistance to said supply source whereby a voltage is induced in said second winding, means for relatively displacing said windings whereby said voltage is varied from a maximum in one direction to a maximum in another direction, a second resistance connected between an intermediate point of said source and a point between said first resistance and said inductance and means for applying the resultant of said voltage and a voltage drop across said second resistance to the input circuit of said discharge device.

7. The combination in a system of control, of an electric discharge device provided with input and output circuits, a source of alternating current for applying an alternating voltage to said output circuit, a resistance, a pair of inductively associated relatively rotatable windings, connections whereby one of said windings is connected in series with said resistance to said supply source whereby a voltage is induced in said second winding, means for relatively displacing said windings whereby said voltage is varied from a maximum in one direction to a maximum in another direction, a second resistance connected between an intermediate point of said source and a point between said first resistance and said inductance, means for applying the resultant of said voltage and a voltage drop across said second resistance to the input circuit of said discharge device, and means for varying the phase relation of the voltage across said second resistance and the voltage of said supply source.

HAROLD B. LA ROQUE.
FRANK R. ELDER.